March 8, 1932.  J. L. HACKETT  1,848,475
ADJUSTABLE TABLE EXTENSION
Filed Nov. 26, 1928
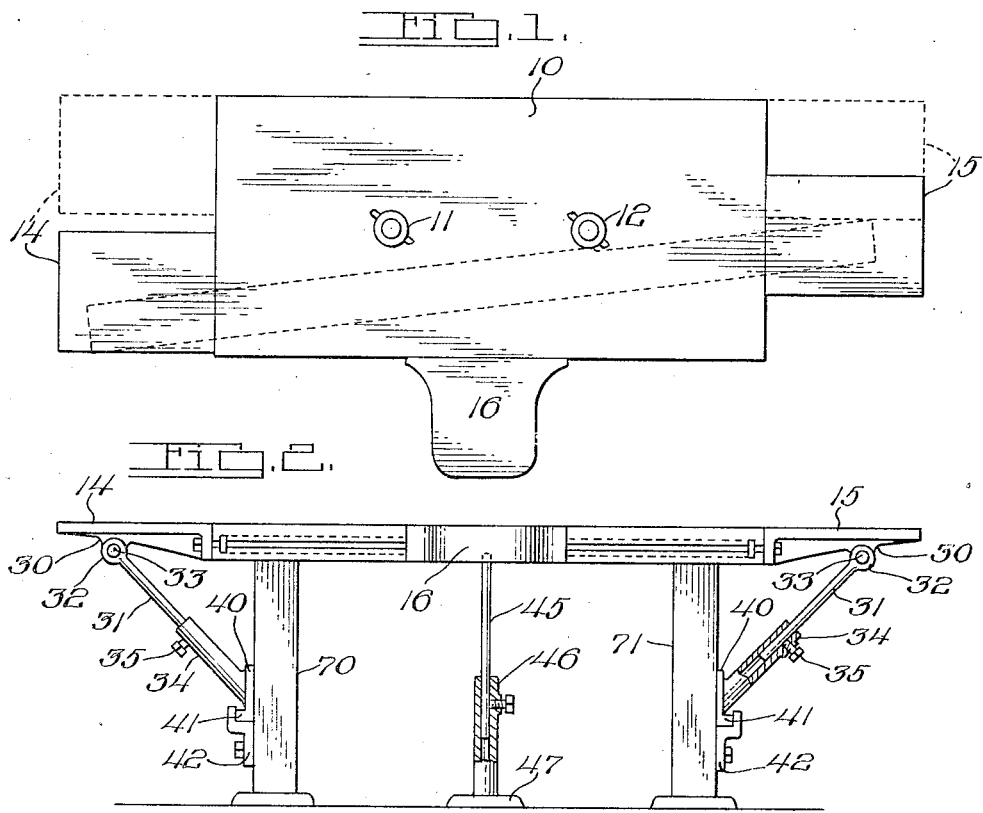
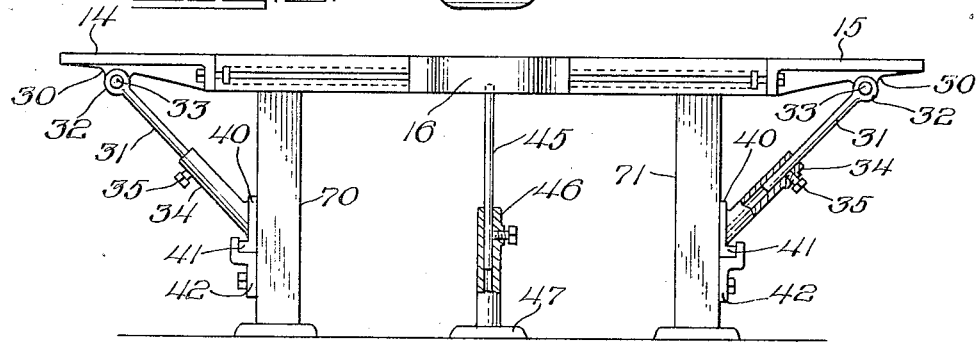
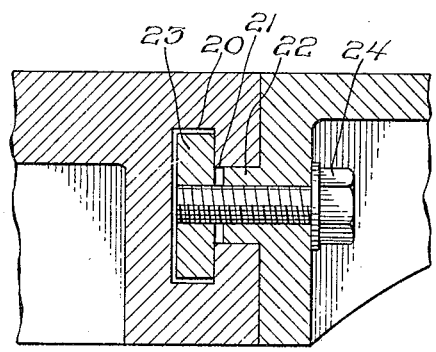 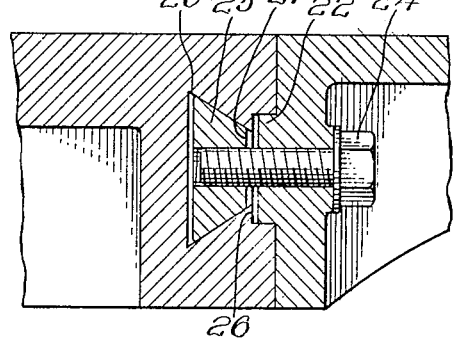
INVENTOR
James Lee Hackett
BY
ATTORNEYS Patented Mar. 8, 1932

1,848,475

UNITED STATES PATENT OFFICE

JAMES LEE HACKETT, OF DETROIT, MICHIGAN

ADJUSTABLE TABLE EXTENSION

Application filed November 26, 1928. Serial No. 321,792.

The principal object of my invention is to provide adjustable and removable extensions for a table or similar structure.

Another object of my invention is to provide means for joining adjustable extensions to tables or like structures which comprises a joint adapted to maintain the surface of the extension in proper alignment with the surface of the table at all times, and to permit horizontal movement of the extension relative to the table, and to provide adjustable and movable elevational supporting means for such extensions.

My invention is particularly applicable to tables or benches of woodworking machinery such as shapers, although it is to be understood that it is also applicable to other like structures. Such shapers are ordinarily made with a bench or table of standard size. Ordinarily, the pieces being shaped on such tables are held in forms whose main dimensions are relatively the same as the dimensions of the work piece. In the manufacture of automobile bodies, and the like, it is frequently necessary to shape long wood pieces such as sill members or top rail members, and the standard size table is not of sufficient size to properly support the work piece and its form as it is manipulated on the table. The present practice under such conditions, is to build wooden extensions to the standard shaper table, which are frequently unsatisfactory because it is difficult to construct such extensions so that they will continue without interrupting the surface of the shaper table in such a manner that the work piece and form will slide over the extension without any alteration or disturbance of its position relative to the cutting members of the shaper.

I have provided extensions for such tables and means for joining the same to the table, and means for supporting the same, which are all adjustable to desired positions, and which will extend the working surface of the table as desired, and will always provide an extension surface which both in itself and in its joint with the main table, will not disturb the progress or movement of the form or work piece relative to the shaper knives.

With these and other objects in view, my invention consists in the arrangement, combination and construction of the various parts of my improved device, as described in the specification, claimed in my claims and shown in the accompanying drawings, in which:

Fig. 1 is a plan view of a shaper showing my extensions in place at the front and side, showing on the left side in dotted lines the adjustable position of the left extension, and showing the shaper form in dotted lines on the table.

Fig. 2 is a front elevation of a shaper table embodying my invention.

Fig. 3 is a cross sectional view of one form of joint between the extension and table.

Fig. 4 is a cross sectional view in a modified form of joint between the extension and table.

The numeral 10 indicates the shaper table. The numerals 11 and 12 indicate the rotary cutting members of the shaper. The numeral 14 indicates the left hand extension embodied in my invention, and the numeral 15 indicates the right hand extension, while the numeral 16 indicates the extension on the front of the table.

The shaper table 10 is ordinarily constructed of metal, and the extensions 14, 15 and 16 which I have provided are preferably constructed of like metal. In the edges of the table at which the extensions are positioned, I have provided longitudinal slots extending substantially the full length of each edge. These slots are best shown in cross section in Figs. 3 and 4. The slots comprise an inner or enlarged portion 20 and a restricted opening portion 21. The extension members are of less width than the table and provided with edges aligning with the table edges and having guide lugs 22 formed along the edge which slidably fit in the reduced portions 21 of the slots 20 in such manner as completely to obviate risk of relative displacement of said edges. Within the enlarged portions of the slots 20 are slidably positioned nuts or retaining members 23 which are of a size that will not pass through the reduced portion of the slot 21. A bolt 24 is passed through a suitable aperture in the extension member, which passes through the guide lug 22 and the end of the bolt is turned into a threaded aperture in the nut 23, thereby securing the extension to the table proper in such a manner that it may be slid along the edge of the table to a desired position and secured by tightening the bolt.

In Fig. 4 I have shown a modification of the form of the slot 20 and the reduced portion 21. The enlarged portion of the modified form 20 has inclined walls, and fitted therein is a nut 25 having inclined sides matching the walls of the slot. The secondary slot for the guide member 22 of this modified form is enlarged somewhat relative to the restricted opening into the enlarged portion of the slot 20 to provide shoulders 26 against which the faces of the guide lug 22 may bear.

In order to support the extensions 14 and 15 which are normally attached to the ends of the table, I have provided eye lugs 30 on their under sides, a shank member 31 having an eye portion 32 formed in one end adapted to fit the eye lug 30 and to be pivotally attached thereto by a pin 33. A sleeve member 34 is provided which has a longitudinal opening in its central portion as shown to the right in Fig. 2, in which the shank portion 31 slidably fits. A set screw 35 is provided in the sleeve of the member 34 and is adapted to turn down upon the shank member 31 and to hold it in any desired position. The other ends of the sleeve members 34 have foot members 40 formed thereon which bear against the vertical end supports 70 and 71. On the ends of the foot members 40 are formed lateral toe members 41 which extend at right angles to the plane of the foot members 40. Brackets 42 are secured to the table supports 70 and 71 by bolts such as shown, and are offset outwardly and upwardly in their upper portions to provide a groove in which the toe members 41 may slide. These brackets 42 extend over such portion of the width of the end supports 70 and 71 as may be necessary to permit the full movement of the extensions.

The support for the front extension 16 comprises a shank member 45 working in a sleeve member 46 and a foot member 47 attached to one end of the sleeve member 46 and adapted to bear upon the floor or other surface upon which the table is positioned. Such tables ordinarily do not have side supports, and it is therefore necessary that the support for the front extension be based upon the floor. The under side of the extension 16 has a suitable socket formed therein in which the upper end of the member 45 may bear. The adjoining edges of the table proper and the extensions may be either rounded or square. Properly constructed, they will be self aligning through the instrumentality of the guiding lugs 22 in their reduced portions 21 of the slots in the side edges of the main table.

The front extension 16 is preferably flared and radiused at its inner end, as shown in Fig. 1. This provides a longer adjoining edge for the extension, which in many cases is convenient in supporting the long shaper forms for which the extensions are used.

Each of the extensions may be slid substantially the entire length of the edge to which it is attached, and by means of its supports may be adjusted in any desired position within this range. In the modified form of slot and retainer as shown in Fig. 4, a clearance space is provided between the end of the lug 22 and the shoulders 26 so that the nut 25 may be tightly drawn in the slot 20 without being stopped by the inner end of the guiding lug 22.

Also in the form shown in Fig. 3 the lug 22 does not extend entirely through the reduced portion 21, thus clearing the nut 23 and permitting such tightening of the bolt 24 as may be desired to secure the extension in fixed position. The clearance in each form described permits the edges of the working surface of the table and extensions to be closely aligned by tightening the bolts 24.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In combination, a table, an extension slidable along an edge thereof, a sliding joint between said edge and said extension comprising a longitudinal slot in the edge of one of said members having a uniformly restricted opening, a rigid and integral projection on the other of said members slidably fitting in said restricted opening in such manner as to obviate vertical displacement of adjacent edges thereof, a retaining nut slidably fitted in the unrestricted portion of said slot and of a size that will not pass through said restricted portion, and means extending through the restricted portion of said slot and joining said retaining nut to the unslotted member.

2. In combination, a table, an extension slidable along an edge thereof, and a sliding joint therebetween comprising a longitudinal slot in the edge of one of said parts having a restricted opening, an integral guide lug formed on the adjoining edge of the other of said parts and slidably fitting the restricted portion of said slot in such manner as to obviate vertical displacement of adjacent edges thereof, a nut slidable in the unrestricted portion of said slot, and a bolt extending through the restricted opening in said slot and joining the unslotted part to said nut.

3. In combination, a table, an extension slidable along an edge thereof, and a sliding joint therebetween comprising a longitudinal slot in the edge of one of said parts having a restricted opening, a guide lug formed on the adjoining edge of the other of said parts and slidably fitting the restricted portion of said slot, a nut slidable in the unrestricted portion of said slot, and a bolt extending through said guide lug and the restricted opening in said slot and joining the unslotted part to said nut.

4. In combination, a table, an extension slidable along an edge thereof, a sliding joint therebetween comprising a longitudinal slot in the edge of one of said parts having a restricted opening, a retaining nut slidably positioned in said slot and retained by said restricted opening, a guide lug on the other of said members slidably fitting in the restricted portion of said slot opening and terminating short of the inner end of said opening and said retaining nut, and a bolt extended through said lug and into said retaining nut for securing said parts together.

5. In combination a table, an end extension therefor movable longitudinally of an edge thereof, a sliding joint therebetween comprising a longitudinal slot in the edge of one of said parts having a restricted opening, a rigid projection on the other of said members slidably fitting in said restricted slot opening, a retaining nut slidably fitted in the unrestricted portion of said slot and of a size that will not pass through said restricted opening, means extending through the restricted slot opening and securing said retaining nut to the unslotted part, vertical supports for said table positioned beneath the ends thereof, and supporting means for the outer end of said extension comprising a member having one end slidably secured to the table support, a member having one end pivotally secured to said extension and telescopically engaging the free end of said first member, and means for securing said members together.

6. In combination a table, a side extension therefor, a sliding joint therebetween permitting said extension to slide along an edge of said table and comprising a longitudinal slot in the edge of one of said parts having a restricted opening, a rigid projection on the other of said parts slidably fitting in said restricted slot opening, a retaining nut slidably fitted in the unrestricted portion of said slot and of a size that will not pass through said restricted opening, means extending through the restricted slot opening and securing said retaining nut to the unslotted part, and a vertical support for said extension comprising a member having a base on one end thereof movable with said extension longitudinally of the edge of said table, a second member telescopically engaging said first member and having one end pivotally engaging the under side of said extension, and means for securing said supporting members in adjusted position relative to each other.

7. In combination, a table, an extension therefor in edge to edge relationship thereto, a slidable joint therebetween permitting said extension to slide longitudinally of the edge of said table comprising an integral projection on one of said parts slidable in a recess in the other of said parts, and means for holding said projection and recess in adjoined relation in such manner as to obviate vertical displacement of adjacent edges thereof.

8. In combination, a table, an extension therefor, a laterally adjustable joint therebetween permitting sliding of said extension along an edge of said table and adapted to position the top surfaces of said parts in the same plane, one of said parts being slotted and the other being so provided with an interfitting integral lug as to obviate vertical displacement therebetween, and means for securing said joint.

9. In combination, a shaper table, an extension therefor, and means for connecting said extension to said table in co-planar relation therewith for sliding movement along an edge thereof comprising an interengaging integral tongue and a groove formed respectively in and on the co-operating edges of said table and extension, and additional means co-operating between said table and extension for locking said extension to said table in slidably adjusted relationship with respect thereto.

10. In combination, a shaper table, an extension therefor, and means for connecting said extension to said table in edge to edge and co-planar relationship for sliding movement over the length of an edge of said table comprising vertically disposed co-operating surfaces on said table and said extension, a groove in one of said surfaces longitudinally commensurate therewith, an integral projection on the other of said surfaces received in said groove for sliding movement longitudinally thereof, and means co-operating with said groove operable to clamp said surfaces together to lock said extension in slidably adjusted position to said table.

11. In combination, a shaper having a table provided with a horizontal slot at an end thereof, a table extension adapted to be maintained in edge to edge and co-planar relationship with respect to said table, means connecting said extension to an edge at said end of said table for sliding movement longitudinally of said edge, said extension being provided with an integral tongue so entering said slot as to obviate vertical displacement thereof at said edge, a slide carried by said shaper in parallel relation with respect to said edge of said table and spaced below the same, and an outboard support for said extension secured thereto and slidably received by said slide.

JAMES LEE HACKETT.